(12) United States Patent
Seiger et al.

(10) Patent No.: US 12,280,709 B2
(45) Date of Patent: Apr. 22, 2025

(54) LIGHTING DEVICE FOR A VEHICLE

(71) Applicant: HELLA GmbH & Co. KGaA, Lippstadt (DE)

(72) Inventors: Ralf Seiger, Lippstadt (DE); Sebastian Scholz, Soest (DE); Franz-Georg Willeke, Anroechte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/240,496

(22) Filed: Aug. 31, 2023

(65) Prior Publication Data

US 2023/0406194 A1 Dec. 21, 2023

Related U.S. Application Data

(63) Continuation of application No. PCT/EP2022/054826, filed on Feb. 25, 2022.

(30) Foreign Application Priority Data

Mar. 2, 2021 (DE) .................... 10 2021 104 945.8

(51) Int. Cl.
*B60Q 1/08* (2006.01)

(52) U.S. Cl.
CPC ............ *B60Q 1/08* (2013.01); *B60Q 2200/32* (2013.01); *B60Q 2200/38* (2013.01)

(58) Field of Classification Search
CPC ... B60Q 1/08; B60Q 2200/32; B60Q 2200/38
See application file for complete search history.

(56) References Cited

U.S. PATENT DOCUMENTS 4,186,427 A * 1/1980 Ishikawa ................ B60Q 1/068
362/532
4,524,407 A * 6/1985 Igura ..................... B60Q 1/076
362/465

(Continued)

FOREIGN PATENT DOCUMENTS

AT 515451 A1 9/2015
DE 2437572 A1 2/1976

(Continued)

OTHER PUBLICATIONS

International Search Report dated Jun. 9, 2022 in corresponding application PCT/EP2022/054826.

*Primary Examiner* — Arman B Fallahkhair
(74) *Attorney, Agent, or Firm* — Muncy, Geissler, Olds & Lowe, P.C.

(57) ABSTRACT

An illuminating apparatus for a vehicle, in particular a headlamp for a vehicle, comprises a housing, at least one light module for generating a light function, a supporting frame, which is pivotably arranged in the housing. The light module is mounted on the supporting frame such that it is pivoted along with the pivoting of the supporting frame. A manually actuatable adjuster pivots the supporting frame around a horizontal axis. The adjuster has a setting spindle, which is rotatable around its longitudinal axis and is used to pivot the supporting frame, a servomotor including an adjusting element, which is linearly displaceable in a displacement direction for the purpose of implementing an automatic headlamp leveling control. The setting spindle and the adjusting element being connected to each other in such a way that a movement of the adjusting element in the displacement direction effectuates a movement of the setting spindle.

15 Claims, 2 Drawing Sheets

(56) References Cited

U.S. PATENT DOCUMENTS

| | | | | |
|---|---|---|---|---|
| 6,338,567 | B1 * | 1/2002 | Denley | B60Q 1/0683 |
| | | | | 362/284 |
| 6,796,693 | B2 * | 9/2004 | Clinch | B60Q 1/0683 |
| | | | | 362/512 |
| 9,809,151 | B2 * | 11/2017 | Helwig | B60Q 1/08 |
| 11,458,883 | B2 * | 10/2022 | Seel | B60Q 1/076 |
| 11,654,818 | B2 * | 5/2023 | Zhang | F21V 21/14 |
| | | | | 362/524 |
| 2018/0251065 | A1 * | 9/2018 | Kappelhoff | F21S 41/39 |

FOREIGN PATENT DOCUMENTS

| | | |
|---|---|---|
| DE | 10332976 A1 | 4/2005 |
| DE | 102014200237 A1 | 7/2015 |
| EP | 0705729 A1 | 4/1996 |
| EP | 2208639 A1 | 7/2010 |
| EP | 2112021 B1 | 3/2011 |
| FR | 3022984 A1 | 1/2016 |

\* cited by examiner

LIGHTING DEVICE FOR A VEHICLE

This nonprovisional application is a continuation of International Application No. PCT/EP2022/054826, which was filed on Feb. 25, 2022, and which claims priority to German Patent Application No. 10 2021 104 945.8, which was filed in Germany on Mar. 2, 2021, and which are both herein incorporated by reference.

BACKGROUND OF THE INVENTION

Field of the Invention

The present invention relates to an illuminating apparatus for a vehicle, in particular, a headlamp for a vehicle.

Description of the Background Art

A headlamp is known from EP 2 208 639 A1, which is incorporated herein by reference. The headlamp described therein comprises a housing, in which a supporting frame is pivotably arranged in the horizontal and vertical directions. A light module is mounted in the supporting frame in such a way that it is pivoted along with a pivoting of the supporting frame. The light module is used to generate the "low-beam" and "high-beam" light functions. An adjuster is furthermore provided, which is configured to pivot the supporting frame around a vertical axis for the purpose of adjusting the headlamp or the light distribution generated by the headlamp. The adjuster comprises a setting spindle, which is rotatable around its longitudinal axis and is used to pivot the supporting frame. A servomotor is also provided, which includes an adjusting element, which is linearly displaceable in a displacement direction for the purpose of implementing an automatic headlamp leveling control. The servomotor is supported on a carriage, which has a neck with a female thread, which is in engagement with the male thread of the setting spindle. During a rotation of the setting spindle, the carriage including the servomotor is displaced thereby. The setting spindle and the adjusting element are arranged in parallel and at a distance from each other in the transverse direction. By spacing the setting spindle and the adjusting element a distance apart, a comparatively large installation space is needed in the headlamp.

SUMMARY OF THE INVENTION

It is therefore an object of the present invention to provide an illuminating apparatus, which may be designed in a more compact manner.

In an example of the invention, it is provided that the setting spindle and the adjusting element are connected to each other in such a way that a movement of the adjusting element in the displacement direction effectuates a movement of the setting spindle, the movement of the setting spindle taking place in the axial direction at least in a plurality of positions of the adjusting element relative to the setting spindle. The displacement direction of the adjusting element may be in parallel to the longitudinal axis of the setting spindle at least in a plurality of positions of the adjusting element relative to the setting spindle, the setting spindle and the adjusting element being able to be in alignment with each other at least in sections. In particular, the setting spindle and the adjusting element are oriented in parallel to each other, in particular arranged in an axis, at least in a plurality of positions of the adjusting element relative to the setting spindle. By not spacing the setting spindle and the adjusting element a distance apart in the transverse direction, installation space is saved, so that the illuminating apparatus may be provided with a more compact design.

The illuminating apparatus may nevertheless be configured in such a way that a displacement of the adjusting element as well as a rotation of the setting spindle effectuate a pivoting of the supporting frame.

It may be provided that the illuminating apparatus comprises a transfer part connected to the supporting frame, through which the setting spindle extends. The transfer part may be connected to the supporting frame in such a way that a rotational movement of the setting spindle and/or a movement of the setting spindle in the displacement direction of the adjusting element effectuate(s) a pivoting of the transfer part and the supporting frame around the horizontal axis. In particular, the setting spindle may have a male thread, and the transfer part may have a female thread, which is in engagement with the male thread of the setting spindle. The rotational movement of the setting spindle is transferred thereby to a pivoting of the transfer part and the supporting frame around the horizontal axis, using simple means.

It is possible that the adjusting element can have a connecting region for connection to the setting spindle, in particular the connecting region being designed as a ball head, at least in sections. The setting spindle may furthermore have a receptacle for the connecting region of the adjusting element, in particular the receptacle being designed as a socket corresponding to the ball head, at least in sections. In particular, due to the spherical geometry, at least in sections, of the connecting region on the connecting element and the receptacle on the setting spindle, the setting spindle may execute a rotational movement around its axis despite being directly connected to the adjusting element. In addition, due to the spherical geometry, at least in sections, of the connecting region on the connecting element and the receptacle on the setting spindle, the setting spindle may be easily tilted out of the displacement direction, despite a translational movement of the adjusting element, to thereby facilitate a pivoting of the transfer part and the supporting frame around the horizontal axis.

It may be provided that the adjusting element can have a connecting part, which is connected to the end of the setting spindle facing away from the adjusting element in such a way that a rotational movement of the connecting part is transferred to a rotational movement of the setting spindle. The end of the setting spindle facing away from the adjusting element may be designed as a ball head, at least in sections, and the connecting part may have a receptacle, which is designed as a socket corresponding to the ball head, at least in sections. Due to the spherical geometry, at least in sections, of the end of the setting spindle and the receptacle on the connecting part, the setting spindle may also be easily tilted out of the displacement direction to thereby facilitate a pivoting of the transfer part and the supporting frame around the horizontal axis.

It is possible that the adjuster can have a sleeve, rotatable around a longitudinal axis, in which the end of the connecting part facing away from the setting spindle is received in such a way that it is axially movable in the sleeve, and a rotational movement of the sleeve is transferred to a rotational movement of the connecting part. In particular, the connecting part may be received in the sleeve in such a way that it is able to move in the axial direction but not in the circumferential direction of the sleeve. For this purpose, projections may be arranged, for example, on the connecting part, which engage with grooves of the sleeve extending in the axial direction.

It may be provided that the illuminating apparatus can include a control element for the vertical adjustment of the supporting frame, which is connected indirectly or directly to the sleeve in such a way that a rotational movement of the control element is transferred to the sleeve. The sleeve may have an outer toothing, via which the rotational movement of the control element is transferred indirectly or directly to the sleeve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The illuminating apparatus shown in the figures is designed as a headlamp and comprises at least one light module, preferably multiple light modules for generating a plurality of light functions. In particular, the light functions are a low-beam and a high-beam. Further light functions may indeed be integrated into the headlamp, for example a daytime running light.

Figure 1:
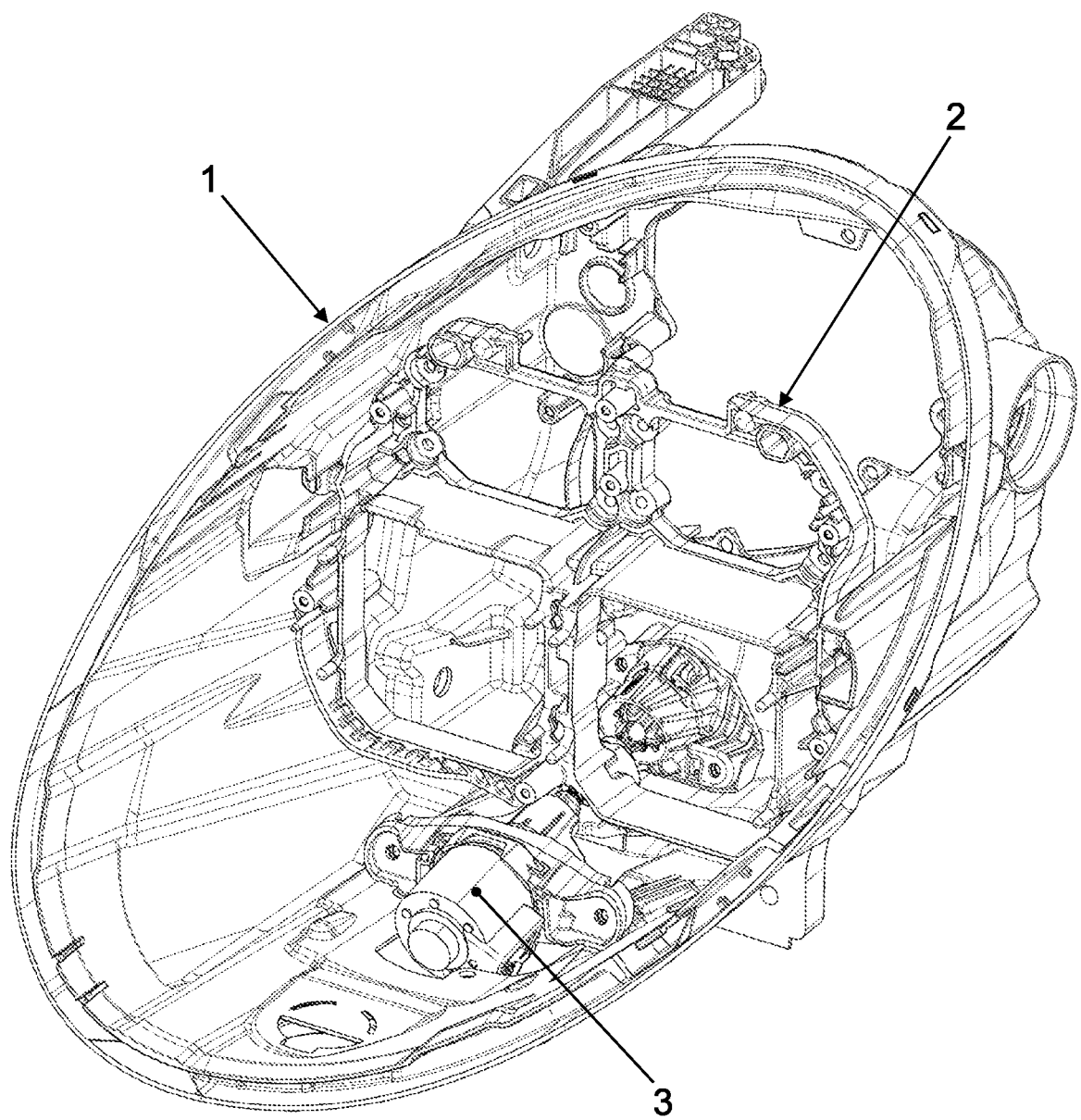
FIG. 1 shows a perspective view of parts of an illuminating apparatus according to the invention.
Figure 2:
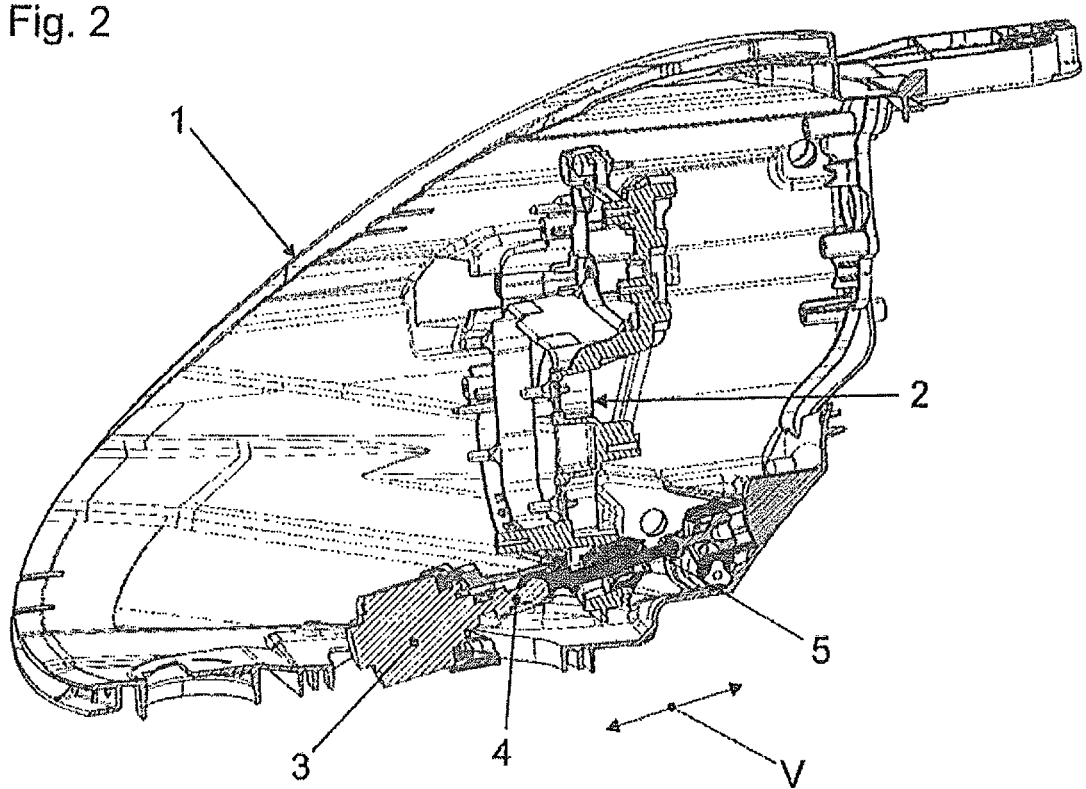
FIG. 2 shows a sectional view of the parts of the illuminating apparatus according to FIG. 1.

The illuminating apparatus comprises a housing 1, only parts of which are shown in the figures (cf., in particular, FIG. 1 and FIG. 2). The illuminating apparatus further comprises a supporting frame 2, which is arranged in housing 1 so as to be horizontally and vertically pivotable. The at least one light module is mounted in or on supporting frame 2 in such a way that it is pivoted along with a pivoting of supporting frame 2.

The illuminating apparatus also comprises a device for automatic headlamp leveling control. For this purpose, the illuminating apparatus includes a servomotor 3 designed as a linear servomotor, which has a linearly displaceable adjusting element 4, which is designed as the tappet of the linear servomotor. Depending on the switching position of servomotor 3, adjusting element 4 is displaceable in a displacement direction V (cf. FIG. 2 and FIG. 3), which is oriented perpendicularly to the horizontal pivot axis and essentially in parallel to the vehicle longitudinal axis.

Servomotor 3 is controlled by a control unit for dynamically setting the leveling of the headlamp during operation. For example, adjusting element 4 may be adjusted depending on the present traffic situation in such a way that the light/dark boundary of the light distribution generated by the at least one module is varied, depending on the preceding or oncoming traffic, so that a blinding of the other road users is avoided, on the one hand, and the broadest possible illumination of the road space is ensured, on the other hand.

The illuminating apparatus further comprises a manually actuatable adjuster, which is configured to pivot supporting frame 2 around the horizontal pivot axis. The manually actuatable adjuster permits a manual basic setting of the at least one light module around the horizontal pivot axis.

Figure 3:
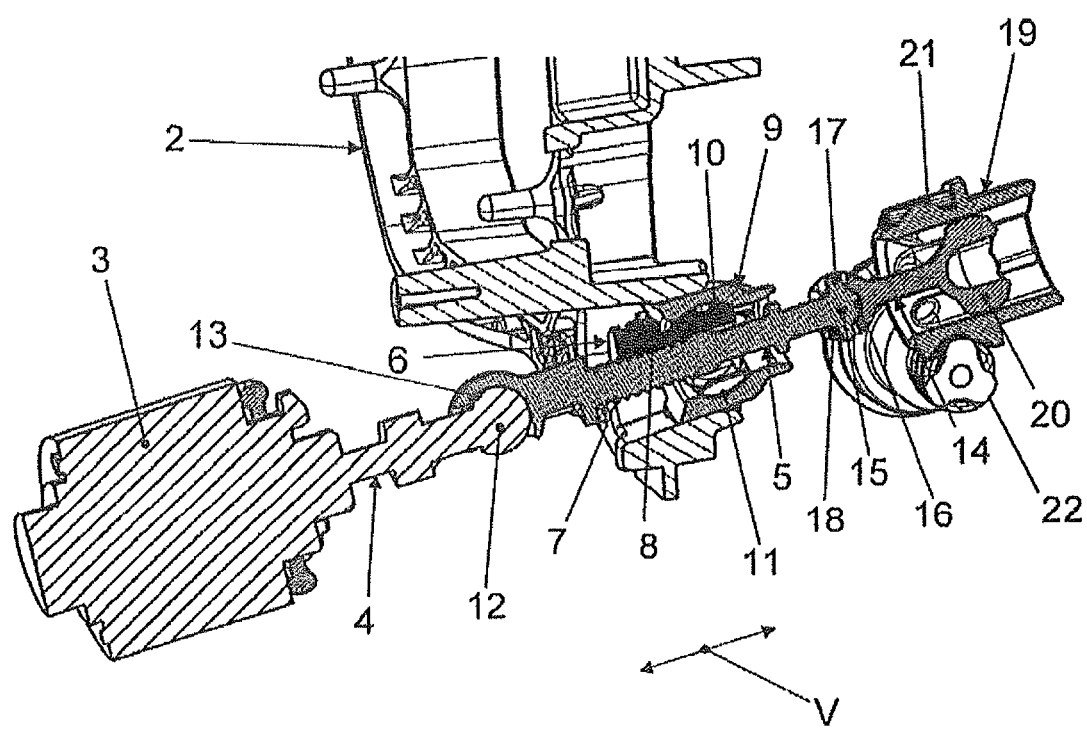
FIG. 3 shows a detail of FIG. 2.

The adjuster comprises a setting spindle 5, rotatable around its longitudinal axis, and a transfer part 6, through which setting spindle 5 extends (cf. FIG. 3). Setting spindle 5 has a male thread 7, which is in engagement with a female thread 8 arranged on transfer part 6. A rotational movement of setting spindle 5 is transferred thereby to a translational movement of transfer part 6.

Transfer part 6 is received by a holding section 9 connected to supporting frame 2. Transfer part 6 has a spherical geometry 10 in sections on its outside, which is received by a hollow spherical geometry 11 in sections of holding section 9. Transfer part 6 is connected to supporting frame 2 via holding section 9 in such a way that a rotational movement of setting spindle 5 effectuates a pivoting of transfer part 6, holding section 9, and supporting frame 2 around the horizontal pivot axis.

A pivoting of the lower part of supporting frame 2 and holding section 9 on a semicircular path results in different angular positions between holding section 9, on the one hand, and setting spindle 5 and transfer part 6 in rotational engagement therewith, on the other hand. These different angular positions are made possible by a corresponding pivotability of spherical geometry 10 arranged on the outside of transfer part 6 in hollow spherical geometry 11 of holding section 9.

The setting spindle is connected to adjusting element 4 on its left end in FIG. 3. Adjusting element 4 has a connecting region 12, designed as a ball head at least in section, for connection with the setting spindle. Setting spindle 5 also has a receptacle 13 for connecting region 12 of adjusting element 4, which is designed as a socket corresponding to the ball head at least in sections.

Due to the connection of adjusting element 4 to setting spindle 5, setting spindle 5 also moves in displacement direction V of adjusting element 4 during a movement of adjusting element 4. Due to the spherical geometry, at least in sections, of connecting region 12 on the adjusting element 4 and receptacle 13 on setting spindle 5, setting spindle 5 may execute a rotational movement around its axis despite being directly connected to adjusting element 4. As a result, a displacement of adjusting element 4 in displacement direction V as well as a rotation of setting spindle 5 around its longitudinal axis may effectuate a pivoting of supporting frame 2.

The adjuster furthermore includes a connecting part 14, which is connected to the end of setting spindle 5 facing away from adjusting element 4 in such a way that a rotational movement of connecting part 14 is transferred to a rotational movement of setting spindle 5. The end of setting spindle 5 facing away from adjusting element 4 is designed as a ball head 15, at least in sections, connecting part 14 having a receptacle 16, which is designed as a socket corresponding to ball head 15, at least in sections.

To ensure the transfer of the rotational movement from connecting part 14 to setting spindle 5, setting spindle 5 has nibs 17, which project radially to the outside in the illustrated exemplary embodiment, and which engage with corresponding recesses 18 in connecting part 14.

The adjuster also has a sleeve 19, rotatable around a longitudinal axis, in which end 20 of connecting part 14 facing away from setting spindle 5 is received in such a way that it is axially movable in sleeve 19, and a rotational movement of sleeve 19 is transferred to a rotational movement of connecting part 14. End 20 of connecting part 14 is received in sleeve 19 in such a way that it is able to move in sleeve 19 in the axial direction but not in the circumferential direction. For this purpose, projections may be arranged, for example, on end 20 of connecting part 14, which engage with grooves extending in the axial direction of sleeve 19.

Due to the mobility of end 20 of connecting part 14 in sleeve 19 in the axial direction of sleeve 19, setting spindle 5 may be in engagement with sleeve 19 via connecting part 14 despite a displacement effectuated by adjusting element 4 in displacement direction V.

End 20 of connecting part 14 received in sleeve 19 has a spherical geometry in sections on its outside, so that the end connected to setting spindle 5 in FIG. 3 is able to easily move up and down. Due to this movement capability and due to the spherical geometry, at least in sections, of the end of setting spindle 5 and receptacle 16 on connecting part 14, setting spindle 5 may be easily tilted out of the orientation in parallel to displacement direction V shown in FIG. 3 to thereby facilitate a pivoting of transfer part 6 of holding section 9 and supporting frame 2 around the horizontal axis.

At the same time, the changing angular position between displacement direction V of adjusting element 4 and the axial direction of setting spindle 5 is compensated by a pivoting movement of the spherical geometry of connecting region 12 of connecting element 4 in receptacle 13 of setting spindle 5.

The adjuster further includes a control element 22 for the vertical adjustment of supporting frame 2, which is connected indirectly or directly to sleeve 19 in such a way that a rotational movement of the control element 22 is transferred to sleeve 19. For this purpose, sleeve 19 has an outer toothing 21 (cf. FIG. 1 and FIG. 3), via which the rotational movement of the control element 22 is transferred indirectly or directly to sleeve 19.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An illuminating apparatus for a vehicle, in particular a headlamp for a vehicle, the apparatus comprising:
    a housing;
    at least one light module for generating a light function;
    a supporting frame pivotably arranged in the housing, the at least one light module being mounted on the supporting frame such that it is pivoted along with a pivoting of the supporting frame;
    a manually actuatable adjuster, which is configured to pivot the supporting frame around a horizontal axis, the adjuster comprising a setting spindle, which is rotatable around its longitudinal axis and is used to pivot the supporting frame; and
    a servomotor having an adjusting element that is linearly displaceable in a displacement direction to implement an automatic headlamp leveling control,
    wherein the setting spindle and the adjusting element are connected to each other such that a movement of the adjusting element in the displacement direction effectuates a movement of the setting spindle, the movement of the setting spindle taking place in the axial direction at least in a plurality of positions of the adjusting element relative to the setting spindle.

2. The illuminating apparatus according to claim 1, wherein the illuminating apparatus comprises a transfer part connected to the supporting frame, through which the setting spindle extends.

3. The illuminating apparatus according to claim 2, wherein the transfer part is connected to the supporting frame such that a rotational movement of the setting spindle and/or a movement of the setting spindle in the displacement direction of the adjusting element effectuate(s) a pivoting of the transfer part and the supporting frame around the horizontal axis.

4. The illuminating apparatus according to claim 2, wherein the setting spindle has a male thread, and the transfer part has a female thread, which is in engagement with the male thread of the setting spindle.

5. The illuminating apparatus according to claim 1, wherein the adjuster includes a connecting part connected to the end of the setting spindle facing away from the adjusting element such that a rotational movement of the connecting part is transferred to a rotational movement of the setting spindle.

6. The illuminating apparatus according to claim 5, wherein the end of the setting spindle facing away from the adjusting element is a ball head, at least in sections, and wherein the connecting part has a receptacle, which is a socket corresponding to the ball head, at least in sections.

7. The illuminating apparatus according to claim 5, wherein the adjuster has a sleeve, rotatable around a longitudinal axis, in which the end of the connecting part facing away from the setting spindle is received such that it is axially movable in the sleeve, and wherein a rotational movement of the sleeve is transferred to a rotational movement of the connecting part.

8. The illuminating apparatus according to claim 1, wherein the adjusting element has a connecting region for connection to the setting spindle, or wherein the connecting region is a ball head, at least in sections.

9. The illuminating apparatus according to claim 8, wherein the setting spindle has a receptacle for the connecting region of the adjusting element or wherein the receptacle is a socket corresponding to a ball head, at least in sections.

10. The illuminating apparatus according to claim 1, wherein the illuminating apparatus includes a control element for the vertical adjustment of the supporting frame, which is connected indirectly or directly to the sleeve such that a rotational movement of the control element is transferred to the sleeve.

11. The illuminating apparatus according to claim 10, wherein the sleeve has an outer toothing, via which the rotational movement of the control element is transferred indirectly or directly to the sleeve.

12. The illuminating apparatus according to claim 1, wherein the displacement direction of the adjusting element is in parallel to the longitudinal axis of the setting spindle at least in a plurality of positions of the adjusting element relative to the setting spindle.

13. The illuminating apparatus according to claim 1, wherein the setting spindle and the adjusting element are in alignment with each other at least in sections.

14. The illuminating apparatus according to claim 1, wherein the setting spindle and the adjusting element are oriented substantially in parallel to each other or arranged in an axis, at least in a plurality of positions of the adjusting element relative to the setting spindle.

15. The illuminating apparatus according to claim 1, wherein the illuminating apparatus is configured such that a displacement of the adjusting element as well as a rotation of the setting spindle effectuate a pivoting of the supporting frame.

\* \* \* \* \*